United States Patent
Henshaw et al.

(10) Patent No.: US 8,979,189 B2
(45) Date of Patent: Mar. 17, 2015

(54) CANTILEVERED TRAY TABLE AND AIRCRAFT PASSENGER SUITE INCLUDING THE SAME

(71) Applicant: B/E Aerospace, Inc., Wellington, FL (US)

(72) Inventors: Robert J. Henshaw, Newnan, GA (US); Benjamin D. Stephens, Atlanta, GA (US); Francis X. Garing, Atlanta, GA (US); Alexander Nicholas Pozzi, Winston-Salem, NC (US); Glenn Allen Johnson, Rural Hall, NC (US)

(73) Assignee: B/E Aerospace, Inc., Wellington, FL (US)

( * ) Notice: Subject to any disclaimer, the term of this patent is extended or adjusted under 35 U.S.C. 154(b) by 101 days.

(21) Appl. No.: 13/799,326

(22) Filed: Mar. 13, 2013

(65) Prior Publication Data

US 2013/0248654 A1 Sep. 26, 2013

Related U.S. Application Data

(60) Provisional application No. 61/614,042, filed on Mar. 22, 2012, provisional application No. 61/614,060, filed on Mar. 22, 2012.

(51) Int. Cl.
A47B 83/02 (2006.01)
B64D 11/06 (2006.01)

(52) U.S. Cl.
CPC .............. *A47B 83/02* (2013.01); *B64D 11/06* (2013.01); *B64D 11/0604* (2013.01); *B64D 11/0638* (2013.01)

USPC ...... 297/147; 297/135; 297/158.1; 297/158.2

(58) Field of Classification Search
USPC ............................ 297/135, 147, 158.1, 158.2
See application file for complete search history.

(56) References Cited

U.S. PATENT DOCUMENTS

| | | | | |
|---|---|---|---|---|
| 1,903,954 | A * | 4/1933 | Blumenthal | 297/158.2 |
| 5,803,326 | A * | 9/1998 | Krieger et al. | 297/135 X |
| 6,059,364 | A * | 5/2000 | Dryburgh et al. | 297/354.13 |
| 7,399,031 | B2 * | 7/2008 | Gardner | 297/158.1 X |
| 7,966,952 | B2 * | 6/2011 | Fissette et al. | 108/166 |
| 8,528,968 | B2 * | 9/2013 | Moulton et al. | 297/147 |
| 8,616,137 | B2 * | 12/2013 | Collins et al. | 297/135 X |
| 8,678,312 | B2 * | 3/2014 | Headrick et al. | 244/118.6 |
| 2006/0220425 | A1 * | 10/2006 | Becker et al. | 297/188.16 |
| 2007/0145791 | A1 * | 6/2007 | Strasser | 297/162 |
| 2009/0078169 | A1 * | 3/2009 | Osborne et al. | 108/40 |
| 2009/0223417 | A1 * | 9/2009 | Muirhead | 108/13 |
| 2010/0301162 | A1 * | 12/2010 | Hankinson | 244/118.6 |
| 2013/0093221 | A1 * | 4/2013 | Ligonniere et al. | 297/135 X |
| 2013/0313866 | A1 * | 11/2013 | Dryburgh et al. | 297/135 X |
| 2014/0175842 | A1 * | 6/2014 | Headrick et al. | 297/135 X |

* cited by examiner

*Primary Examiner* — Rodney B White
(74) *Attorney, Agent, or Firm* — Shumaker, Loop & Kendrick, LLP

(57) ABSTRACT

A tray table assembly for a passenger seat including a table top having a cantilevered portion configured to slide horizontally between an overseat position and a position forward of a passenger seat, and a linear slide for providing horizontal motion of the table top, the linear slide configured to mount to a wall adjacent the passenger seat and support the table top in a horizontal position. A tray table assembly for an aircraft passenger suite.

18 Claims, 6 Drawing Sheets

US 8,979,189 B2

CANTILEVERED TRAY TABLE AND AIRCRAFT PASSENGER SUITE INCLUDING THE SAME

CROSS-REFERENCE TO RELATED APPLICATIONS

This application claims priority to U.S. Application No. 61/614,042 filed Mar. 22, 2012 and U.S. Application No. 61/614,060 filed Mar. 22, 2012, the contents of which are incorporated by reference herein.

TECHNICAL FIELD AND BACKGROUND OF THE INVENTION

This invention relates generally to aircraft passenger seats and associated amenities, and more particularly, to a cantilevered tray table configured to slide horizontally to allow ingress/egress from a seat, as well a passenger suite including a cantilevered tray table.

Tray tables are associated with most every type and class of aircraft seat to provide a passenger with a flat, horizontal surface for working, dining, etc. Tray tables are typically configured to move between a stowed position when not in use, such as during taxi, takeoff and landing, and a deployed use position during a flight. In coach class seating, tray tables are often attached to the back of a forward positioned seat and pivot downward to a horizontal position for use by an aft-seated passenger. In seating arrangements in which there are no forward positioned seat, such as in premium class seating in which seats are isolated by privacy partitions, tray tables commonly stow to the side of the seat such as within a compartment, and thus require complex hinge assemblies and armatures that allow the tray table to lift, pivot and rotate into position over the passenger's lap.

In either of the aforementioned seating classes, a disadvantage of conventional tray table designs is that the tray table is typically required to be stowed to permit passenger ingress/egress from the seat. In conventional assemblies, stowing the tray table typically requires changing the horizontal orientation of the working surface, which requires the passenger to remove their articles beforehand. This is particularly inconvenient when the passenger intends on only briefly leaving his/her seat, for example to use the lavatory, and where alternate storage space for the articles is limited. It is further inconvenient to have to stow the tray table when adjusting the seat from an upright seating position to a horizontal bed position, particularly when the tray table is supporting food and beverages that are difficult to set elsewhere.

Accordingly, what is needed is a tray table configured for movement to permit ingress/egress from a passenger seat, all the while keeping the working surface of the tray table horizontal and accessible for passenger use. Such a tray table would enhance passenger comfort and convenience.

SUMMARY OF THE INVENTION

It is therefore an object of the present invention to provide a tray table configured to slide horizontally to permit ingress/egress from a seat.

It is a further object of the invention to provide a tray table in which the working surface of the tray table is maintained in a horizontal orientation in both a forward position apart from a seat and a rearward position in use over a seated passenger's lap.

It is a further object of the invention to provide a tray table configured to support at least certain types of articles thereon when the tray table is positioned apart from the seat and/or stowed.

It is a further object of the invention to provide a tray table with a cantilevered design so as to minimally interfere with passenger seat room.

It is a further object of the invention to provide a tray table that makes use of a privacy wall in a seating suite as a supporting wall.

It is a further object of the invention to provide a tray table configured to move while remaining accessible to allow a seat to adjust between an upright and a horizontal bed seating position and allow the passenger to use the tray table in either the upright or horizontal bed seating position.

It is a further object of the invention to provide a tray table assembly including a release mechanism for sliding the table horizontally that is accessible by both the passenger and aircraft crew.

These and other objects and advantages are achieved by providing a tray table assembly for a passenger seat including a table top including a cantilevered portion configured to slide horizontally between an overseat position and a position forward of a passenger seat, and a linear slide for providing horizontal motion of the table top, the linear slide configured to mount to a wall adjacent the passenger seat and support the table top in a horizontal position.

In accordance with a further embodiment of the invention, the table top may include a base portion arranged perpendicular to the cantilevered portion, the base portion being mounted to the linear slide.

In accordance with a further embodiment of the invention, the cantilevered portion may be hinged to the base portion.

In accordance with a further embodiment of the invention, the cantilevered portion and the base portion may be unitary to prevent movement therebetween.

In accordance with a further embodiment of the invention, the tray table assembly may include a release latch positioned along a front edge of the table top facing the passenger seat, the release latch being connected to a brake pad through a brake cable, the release latch configured to pull the brake cable to move the brake pad out of contact with the linear slide to move the table top horizontally in either direction.

In accordance with a further embodiment of the invention, the brake pad may pivot about a pivot point such that the table top is able to be pushed toward the position forward of the passenger seat when the brake pad is in a rest position in contact with the linear slide, but may be prevented from moving toward the overseat direction when the brake pad is in the rest position in contact with the linear slide.

In accordance with a further embodiment of the invention, the tray table assembly may include a torsion spring urging the brake into contact with the linear slide when the brake pad is in a rest position to secure the table top from sliding toward the overseat direction.

In accordance with a further embodiment of the invention, the tray table assembly may include a latch and brake pad assembly configured to allow the table top to move toward the position forward of the passenger seat without actuating the latch, and requiring the latch to be actuated to move the table top toward the overseat position, wherein the brake pad engages the linear slide and the latch operates to disengage the brake pad from the linear slide.

In accordance with a further embodiment of the invention, the tray table assembly may include a housing defining a vertical pocket for receiving the table top therein, the table top attached to the housing and slidable relative thereto along a guide rail arranged vertically in the pocket, the housing being attached to the linear slide and configured to slide horizontally with respect to the wall to which the linear slide is mounted.

In accordance with a further embodiment of the invention, the table top may be hinged at one end to a guide that travels within the guide rail in the pocket, and wherein the table top pivots 90 degrees relative to the guide to move the table between vertical and horizontal positions.

According to another embodiment of the invention, provided herein is an aircraft passenger suite including a passenger seat having a seat back and a seat bottom configured to move between an upright and a horizontal bed seating position, a privacy wall positioned adjacent the passenger seat and defining an opening to the suite, and a tray table assembly including a table top having a cantilevered portion configured to slide horizontally between an overseat position and a position forward of the passenger seat, and a linear slide for providing horizontal motion of the table top, the linear slide configured to mount to the privacy wall adjacent the passenger seat and support the table top in a horizontal position.

In accordance with a further embodiment of the invention, the table top may include a base portion arranged perpendicular to the cantilevered portion, the base portion being mounted to the linear slide.

In accordance with a further embodiment of the invention, the cantilevered portion may be hinged to the base portion.

In accordance with a further embodiment of the invention, the cantilevered portion and the base portion may be unitary to prevent movement therebetween.

In accordance with a further embodiment of the invention, the tray table assembly may include a release latch positioned along a front edge of the table top facing the passenger seat, the release latch being connected to a brake pad through a brake cable, the release latch configured to pull the brake cable to move the brake pad out of contact with the linear slide to move the table top horizontally in either direction.

In accordance with a further embodiment of the invention, the brake pad may pivot about a pivot point such that the table top is able to be pushed toward the position forward of the passenger seat when the brake pad is in a rest position in contact with the linear slide, but may be prevented from moving toward the overseat direction when the brake pad is in the rest position in contact with the linear slide.

In accordance with a further embodiment of the invention, the tray table assembly may include a torsion spring urging the brake into contact with the linear slide when the brake pad is in a rest position to secure the table top from sliding toward the overseat direction.

In accordance with a further embodiment of the invention, the tray table assembly may include a housing defining a vertical pocket for receiving the table top therein, the table top attached to the housing and slidable relative thereto along a guide rail arranged vertically in the pocket, the housing being attached to the linear slide and configured to slide horizontally with respect to the wall to which the linear slide is mounted.

In accordance with a further embodiment of the invention, the table top may be hinged at one end to a guide that travels within the guide rail in the pocket, and wherein the table top pivots 90 degrees relative to the guide to move the table between vertical and horizontal positions.

In accordance with a further embodiment of the invention, the table top may block the opening to the suite when the table top is in the overseat position.

The tray table assembly embodiments disclosed herein may include one or more or any combination of the above features.

BRIEF DESCRIPTION OF THE DRAWING FIGURES

The present invention is best understood when the following detailed description of the invention is read with reference to the accompanying drawings, in which:

FIG. 1 is an overhead perspective view of a passenger suite including a cantilevered tray table in accordance with an embodiment of the invention;

FIG. 2 in an overhead perspective view of a passenger suite with the cantilevered tray table showing the tray table in a forward position to permit seat ingress/egress;

DESCRIPTION OF THE PREFERRED EMBODIMENTS AND BEST MODE

Figure 1:
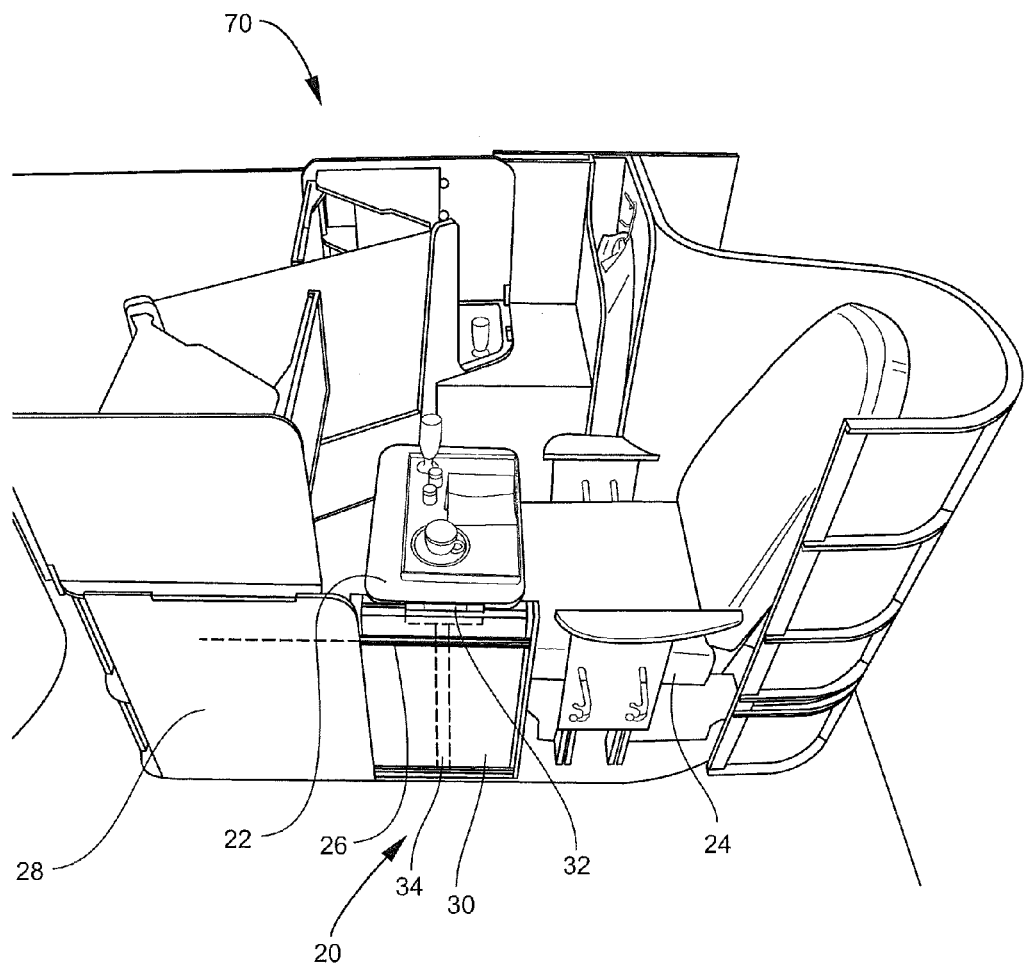

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring now to the drawings, disclosed herein are embodiments of a cantilevered tray table configured to slide horizontally to permit ingress/egress from a passenger seat. The passenger seat may be a seat associated with a passenger suite, such as a suite found in a premium class seating section of commercial airline carrier. The passenger seat may be the type configured to adjust between an upright and horizontal seating position. The tray table embodiments disclosed herein may be supported by any structure within the aircraft, for example, a privacy wall or partition associated with a passenger suite.

In the embodiments disclosed herein, the table top may be maintained in a horizontal orientation in both a forward position apart from a seat and a rearward position in use over a seated passenger's lap, although the elevation of the table top my change between the positions. This allows the passenger to move the table top for egress/ingress from a seat or to adjust the seat between the upright and bed seating positions while leaving articles supported on the table top. The cantilevered design advantageously requires a single wall for support and minimally interferes with passenger seat room. The tray table assembly can further function to close-off an opening to a passenger suite, thereby enhancing privacy.

Figure 2:
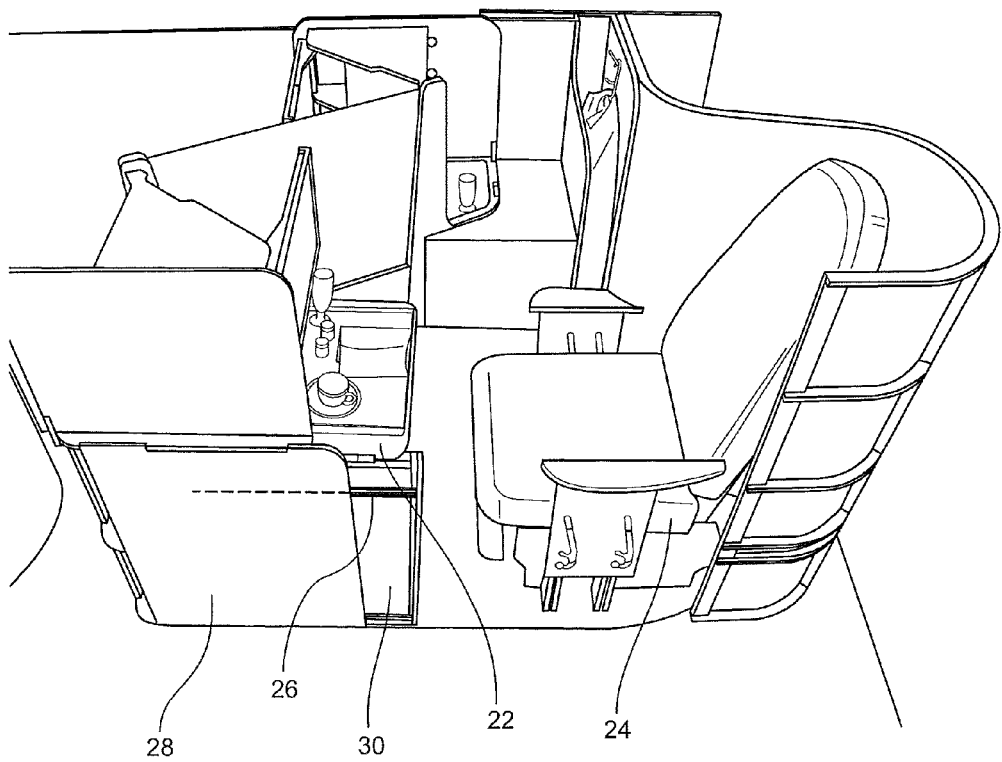

Referring now to the drawing figures, a first embodiment of a tray table assembly for a passenger seat is shown generally in FIGS. 1 and 2 at reference numeral 20. The tray table assembly 20 generally includes a table top 22 including a cantilevered portion configured to slide horizontally between an overseat position (See FIG. 1) and a position forward of a passenger seat 24 (see FIG. 2). The horizontal sliding motion of the table top 22 is achieved by a linear slide 26 configured to mount to the interior side of a privacy wall 28 adjacent the passenger seat 24. The linear slide 26 may be mounted horizontally along the wall 28 to support and guide the movement of the table top 22 in a horizontal position, or at an angle as described below. As used herein, the term "linear slide" is intended to generally describe any device for guiding motion in at least one dimension, and may include, for example, a linear-motion bearing, a rolling element bearing, a roller slide, a plain bearing, etc.

A housing 30 is positioned alongside the wall and defines a vertical pocket therein for receiving the table top 30 in a fully stowed position. The table top 22 is hinged at one end to a guide 32 that travels vertically along a guide rail 34 arranged vertically in the pocket. In this arrangement, the free end of the table top 22 is pivoted upward from a horizontally position into a generally vertical position and then subsequently lowered into the vertical pocket. To withdraw the table top 22 from the pocket, the free end of the table top is grabbed and pulled upward to move the guide 32 to its highest point along the guide rail 34. The table top 22 is then pivoted downward into place. Pivoting range of motion of the table top 22 relative to the guide 32 may be about 90 degrees, for example. The assembly may include any type of release mechanism, latch, lock or automated assistance for moving, stowing, releasing and locking the table top 22 in either the deployed or stowed positions.

Figure 3:
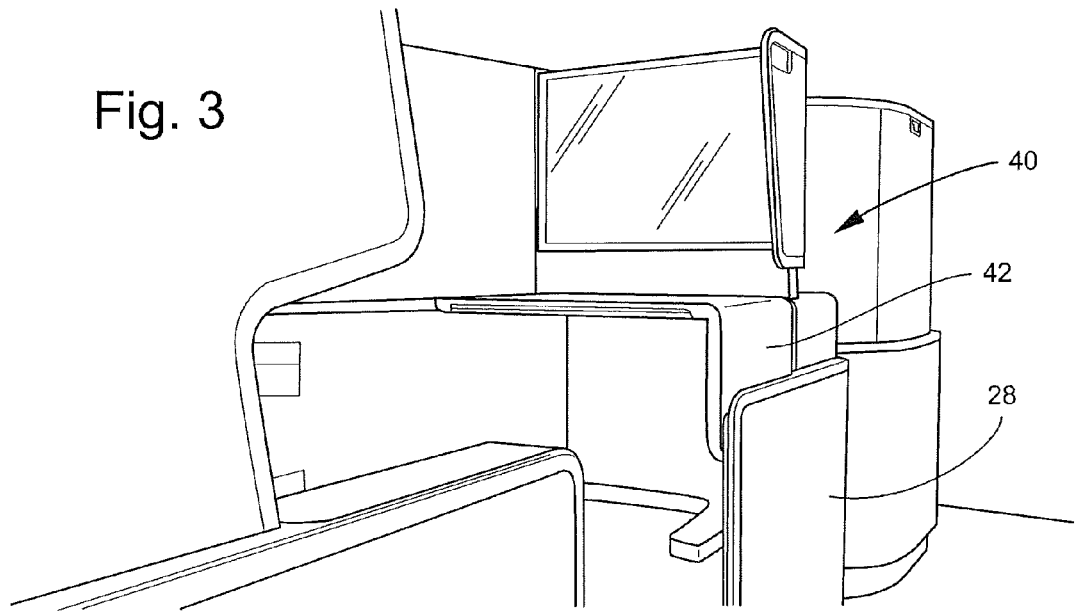
FIG. 3 is a front and side perspective view of the cantilevered tray table.
Figure 4:
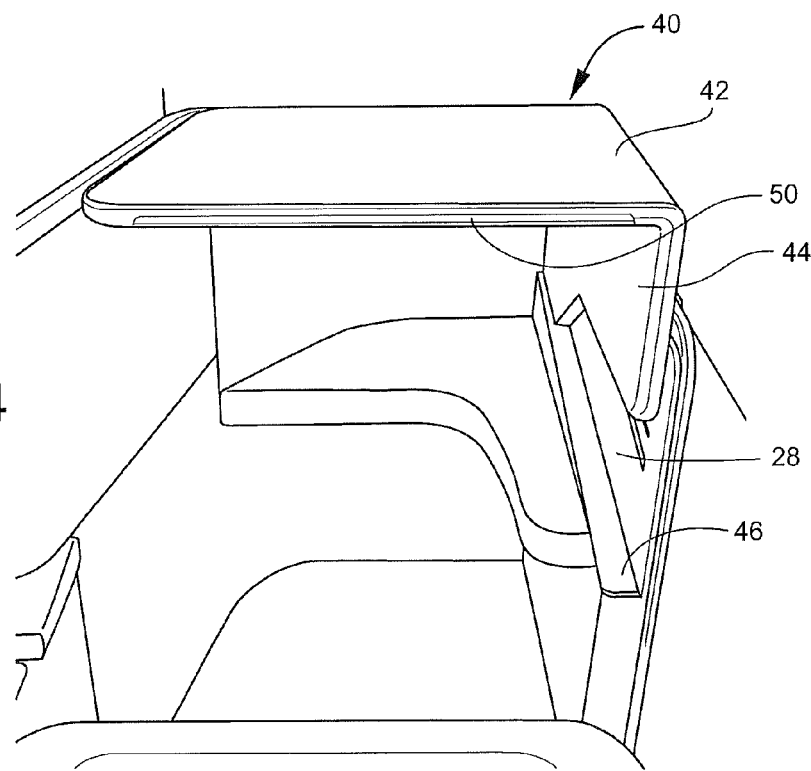
FIG. 4 is a front perspective view of the cantilevered tray table.

Referring to FIGS. 3-7, another embodiment of a cantilevered tray table assembly for a passenger seat is shown generally at reference numeral 40. This embodiment includes a unitary table top portion 42 and base portion 44 arranged perpendicular to each other to utilize the base portion 44 for mounting against a vertical wall, such as a privacy wall 28, to position the table top 42 horizontally. The table top portion 42 is configured to slide horizontally between an overseat position (See FIG. 5) and a position forward of a passenger seat 24 (see FIGS. 3 and 4). The horizontal sliding motion of the table top 42 is achieved by a linear slide 26 configured to mount to the interior side of a privacy wall 28 adjacent the passenger seat 24. The linear slide 26 may be mounted horizontally along the wall 28 to support and guide the movement of the table top 22 in a horizontal position while maintaining a constant elevation. Alternatively, as shown in FIG. 4, the linear slide 26 may be mounted on the wall 28 at an angle so that the table top 42 remains horizontal throughout sliding movement, however changes in elevation.

An elevation change may be desirable and/or necessary to raise the height of the table top 22 in the forward position in order to clear room for the seat to adjust to a bed. In a specific example, the table top 42 may be from 5 cm to 15 cm higher in the forward position apart from the seat, and may move from 30 cm to 50 cm from the overseat position to the forward position, all the while keeping the table surface substantially parallel to the floor. As shown in FIG. 4, the linear slide 26 is mounted at an angle to horizontal, and the base portion 44 may be shaped to contact a ramp 46 mounted adjacent the wall 28 as the table top 42 is pushed from the overseat position toward the forward position apart from the seat. The contact between the base portion 44 and the ramp 46, and the slope of the ramp, may cause the table top 42 to increase in elevation relative to the floor as the table top 42 is pushed forward. The degree of elevation change and elevation pathway is controllable by the slope of the ramp 46 and/or linear slide 26.

Figure 8:
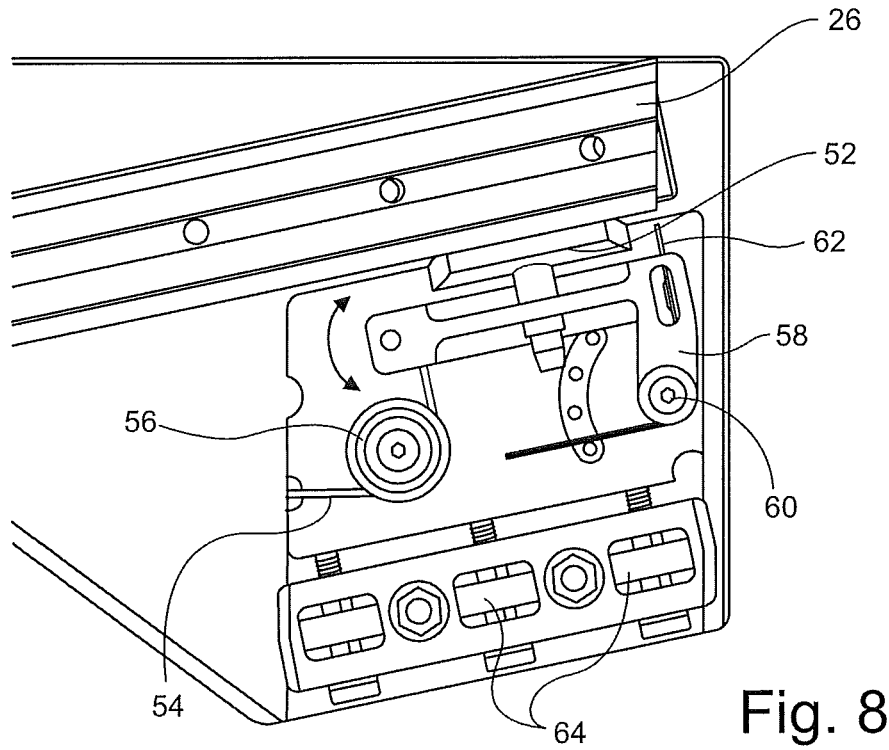
FIG. 8 is a detailed view showing the torsion spring arrangement for applying pressure to the brake to secure the tray table from sliding toward the deployed position.
Figure 9:
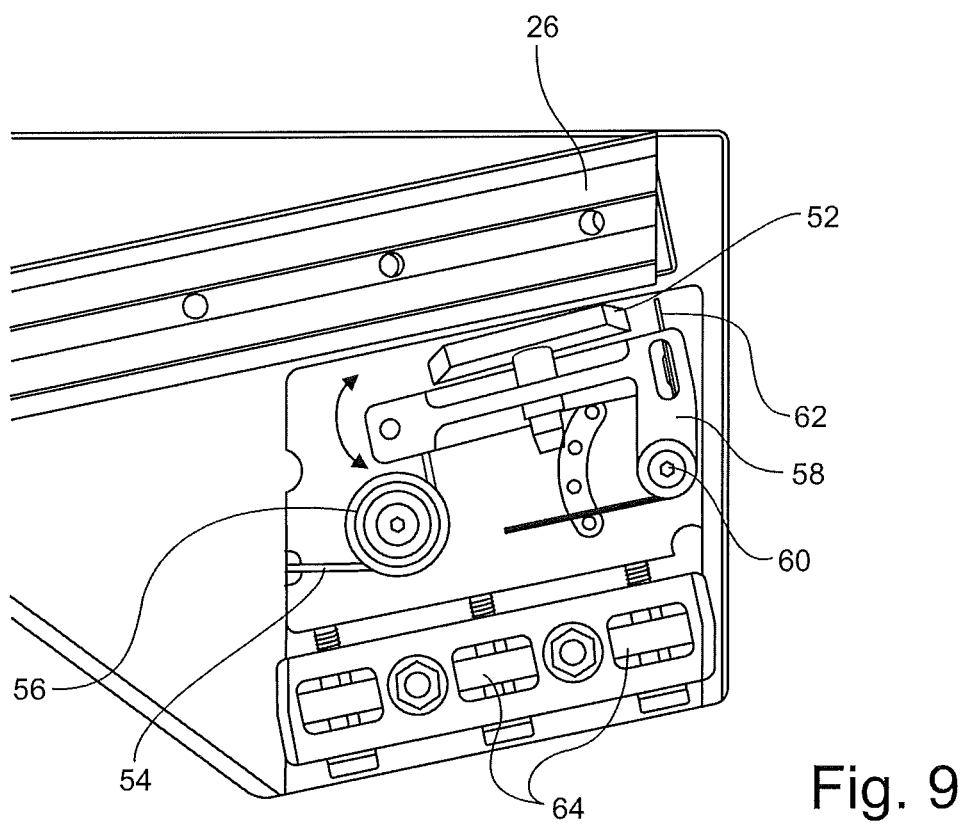
FIG. 9 is a detailed view showing the brake disengaged to allow the tray table to slide along the linear bearing in either direction.

In either tray table embodiment, the assembly can further include a latch and brake mechanism for controlling the sliding movement of the table top. Referring to FIGS. 8 and 9, a release latch 50 is positioned along a front or forward edge of the table top 42 facing the passenger seat (see FIGS. 4 and 6). The release latch 50 is connected to a brake pad 52 through a brake cable 54 that travels around one or more guide pulleys 56. The release latch 50 is operable for pulling the brake cable 54 to move the brake pad 52 out of contact with the linear slide 26 to move the table top horizontally in either direction.

The brake pad 52 is held by an L-shaped member 58 that pivots about a pivot point 60 in order to move the brake pad 52 into and out of contact with the linear slide 26. In a rest position of the brake pad 52, the brake pad is in contact with the linear slide and is arranged generally parallel thereto (see FIG. 8). In a disengaged position, in which the table top can slide horizontally in either direction, the brake pad 52 is arranged at an angle to the linear slide 26 (see FIG. 9). In this arrangement, the table top 22, 42 is able to be pushed toward the position forward of the passenger seat when the brake pad 52 is in the rest position in contact with the linear slide, but is prevented from moving toward the overseat direction. In this arrangement, the table top can be moved toward the position forward of the passenger seat without actuating the release latch, and requires the release latch to be actuated to move the table top toward the overseat position, thus a "one-way" brake is provided. The operation of the release latch 50 is thus advantageous in that it allows a passenger egress from the seat without having to locate and actuate the latch. Additionally, it may be useful for cabin crew to move the table top to a stowed position without locating and actuating the latch.

The release latch and brake assembly further includes a torsion spring 62 that urges the brake pad 52 into contact with the linear slide 26 when the brake pad is in the rest position to secure the table top from sliding toward the overseat direction. One or more rollers 64 or low-friction members that slide along the privacy wall 28 may be provided spaced apart from the linear slide 26 to stabilize the table top. The release latch 50 may be provided along any portion of the length of the table top and may be a bar that is depressed or the like. The release latch 50 is preferably in a position conveniently accessible by both the passenger and crew. The release latch may have an infinite number of position stops along the linear slide to allow the passenger flexibility in positioning the table top.

According to a further embodiment of the invention, disclosed herein is an aircraft passenger suite including a tray table assembly including either embodiment of the tray table assembly disclosed herein. Referring to FIG. 1, the suite is shown generally at reference numeral 70, and includes privacy partitions or walls defining a passenger living space containing a lie-flat capable seat 24, storage compartments, furniture and audio/video equipment, among other features and amenities. The privacy walls positioned adjacent the passenger seat define an opening to the suite. The tray table assembly 20 is configured to slide horizontally between an overseat position (see FIG. 1) and a position forward of the passenger seat (see FIG. 2). The table top 22 blocks the opening to the suite when the table top is in the overseat position, thus enhancing privacy. The table top 22 is clear of the opening to the suite when the table top is in the position forward of the seat, thus permitting egress/ingress to the seat.

The air space above the table top is preferably clear to prevent items from being knocked off when the table top is slid forward.

Figure 5:
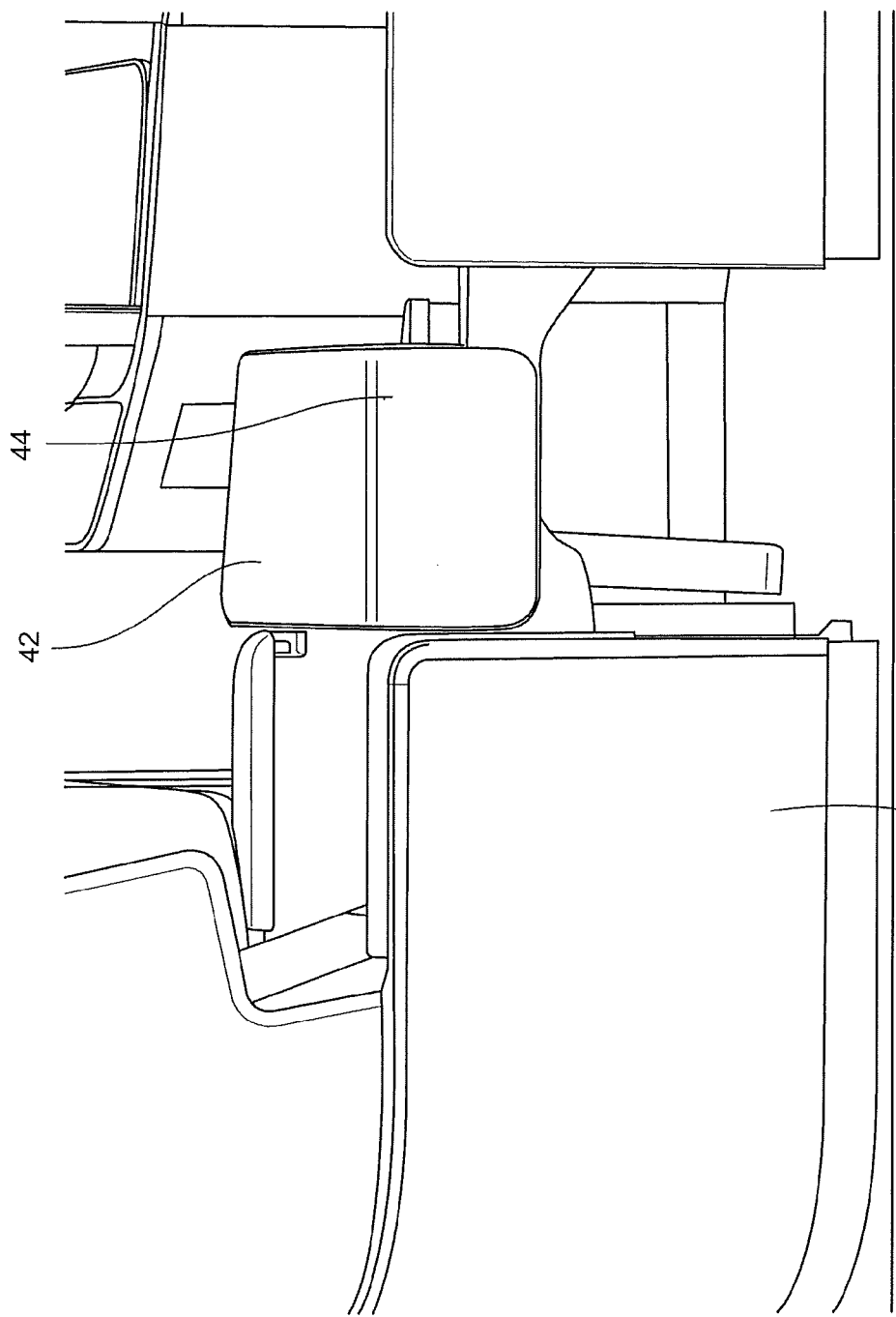
FIG. 5 is a side view of the tray table shown in a rearward position.
Figure 6:
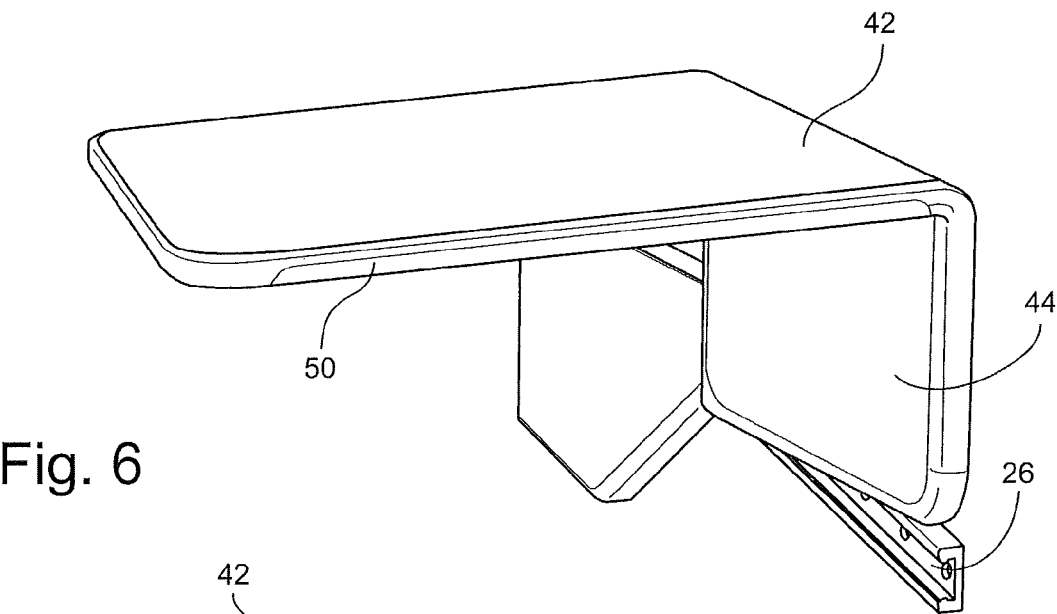
FIG. 6 is an isometric view showing the cantilevered tray table and an associated guide rail.
Figure 7:
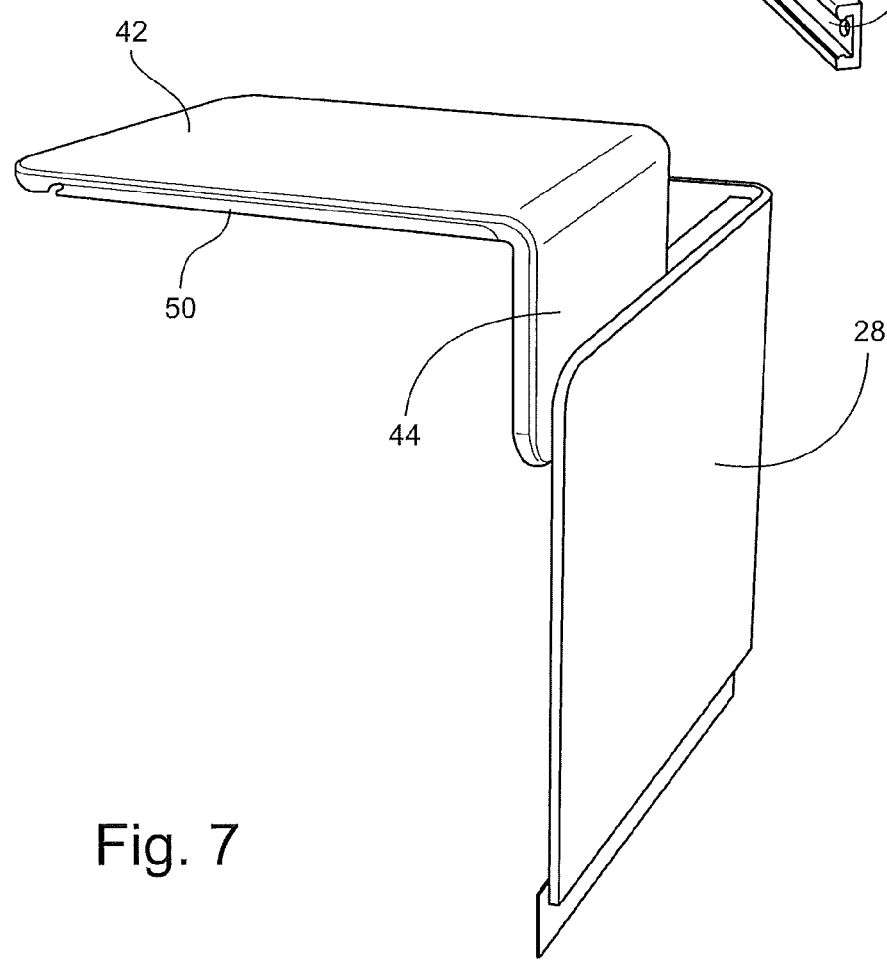
FIG. 7 is a isometric view showing the cantilevered tray table and a supporting wall.

FIGS. 3 and 5 illustrate the same open and blocked positions of the table top with respect to the suite opening, but employing the second tray table embodiment and a different suite arrangement.

Cantilevered tray table embodiments and suite arrangements are described above. Various details of the invention may be changed without departing from the scope of the invention. Furthermore, the foregoing description of the embodiments of the invention and the best mode for practicing the invention are provided for the purpose of illustration only and not for the purpose of limitation.

What is claimed is:

1. A tray table assembly for a passenger seat, comprising:
   a table top including a cantilevered portion configured to slide horizontally between an overseat position and a position forward of a passenger seat;
   a linear slide for providing horizontal motion of the table top, the linear slide configured to mount to a wall adjacent the passenger seat and support the table top in a horizontal position; and
   a release latch positioned along a front edge of the table top facing the passenger seat, the release latch connected to a brake pad through a brake cable, the release latch configured to pull the brake cable to move the brake pad out of contact with the linear slide to move the table top horizontally in either direction.

2. The tray table assembly of claim 1, wherein the table top further includes a base portion arranged perpendicular to the cantilevered portion, the base portion being mounted to the linear slide.

3. The tray table assembly of claim 1, wherein the cantilevered portion is hinged to the base portion.

4. The tray table assembly of claim 1, wherein the cantilevered portion and the base portion are unitary to prevent relative movement therebetween.

5. The tray table assembly of claim 1 wherein the brake pad pivots about a pivot point such that the table top is able to be pushed toward the position forward of the passenger seat when the brake pad is in a rest position in contact with the linear slide, but is prevented from moving toward the overseat direction when the brake pad is in the rest position in contact with the linear slide.

6. The tray table assembly of claim 1, further comprising a torsion spring urging the brake into contact with the linear slide when the brake pad is in a rest position to secure the table top from sliding toward the overseat direction.

7. The tray table assembly of claim 1, wherein the release latch and brake pad are configured to allow the table top to move toward the position forward of the passenger seat without actuating the release latch, and require the release latch to be actuated to move the table top toward the overseat position, wherein the brake pad engages the linear slide and the release latch operates to disengage the brake pad from the linear slide.

8. The tray table assembly of claim 1, further comprising a housing defining a vertical pocket for receiving the table top therein, the table top attached to the housing and slidable relative thereto along a guide rail arranged vertically in the pocket, the housing being attached to the linear slide and configured to slide horizontally with respect to the wall to which the linear slide is mounted.

9. The tray table assembly of claim 1, wherein the table top is hinged at one end to a guide that travels within the guide rail in the pocket, and wherein the table top pivots 90 degrees relative to the guide to move the table between vertical and horizontal positions.

10. An aircraft passenger suite, comprising:
    a passenger seat including a seat back and a seat bottom configured to move between an upright and a horizontal bed seating position;
    a privacy wall positioned adjacent the passenger seat and defining an opening to the suite;
    a tray table assembly including a table top having a cantilevered portion configured to slide horizontally between an overseat position and a position forward of the passenger seat, and a linear slide for providing horizontal motion of the table top, the linear slide configured to mount to the privacy wall adjacent the passenger seat and support the table top in a horizontal position; and
    a release latch positioned along a front edge of the table top facing the passenger seat, the release latch connected to a brake pad through a brake cable, the release latch configured to pull the brake cable to move the brake pad out of contact with the linear slide to move the table top horizontally in either direction.

11. The aircraft passenger suite of claim 10, wherein the table top further includes a base portion arranged perpendicular to the cantilevered portion, the base portion being mounted to the linear slide.

12. The aircraft passenger suite of claim 11, wherein the cantilevered portion is hinged to the base portion.

13. The aircraft passenger suite of claim 11, wherein the cantilevered portion and the base portion are unitary to prevent relative movement therebetween.

14. The aircraft passenger suite of claim 10, wherein the brake pad pivots about a pivot point such that the table top is able to be pushed toward the position forward of the passenger seat when the brake pad is in a rest position in contact with the linear slide, but is prevented from moving toward the overseat direction when the brake pad is in the rest position in contact with the linear slide.

15. The aircraft passenger suite of claim 10, further comprising a torsion spring urging the brake into contact with the linear slide when the brake pad is in a rest position to secure the table top from sliding toward the overseat direction.

16. The aircraft passenger suite of claim 10, further comprising a housing defining a vertical pocket for receiving the table top therein, the table top attached to the housing and slidable relative thereto along a guide rail arranged vertically in the pocket, the housing being attached to the linear slide and configured to slide horizontally with respect to the wall to which the linear slide is mounted.

17. The aircraft passenger suite of claim 10, wherein the table top is hinged at one end to a guide that travels within the guide rail in the pocket, and wherein the table top pivots 90 degrees relative to the guide to move the table between vertical and horizontal positions.

18. The aircraft passenger suite of claim 10, wherein the table top blocks the opening to the suite when the table top is in the overseat position.

* * * * *